(12) United States Patent
Malloy et al.

(10) Patent No.: US 8,935,295 B2
(45) Date of Patent: Jan. 13, 2015

(54) IDENTIFYING AND REPORTING DIFFERENCES IN NETWORK ACTIVITY DATA FILES

(75) Inventors: Patrick J. Malloy, Washington, DC (US); John McNicholas, Germantown, MD (US); John W. Strohm, Rockville, MD (US); Antoine Dunn, Kensington, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 1987 days.

(21) Appl. No.: 11/776,708

(22) Filed: Jul. 12, 2007

(65) Prior Publication Data

US 2008/0016056 A1 Jan. 17, 2008

Related U.S. Application Data

(60) Provisional application No. 60/807,230, filed on Jul. 13, 2006.

(51) Int. Cl.
*G06F 7/00* (2006.01)
*G06F 17/30* (2006.01)
*H04L 12/24* (2006.01)
*G06F 13/14* (2006.01)

(52) U.S. Cl.
CPC ........ *H04L 41/5009* (2013.01); *H04L 41/5035* (2013.01); *H04L 41/22* (2013.01); *H04L 41/5067* (2013.01)
USPC ......................................................... 707/802

(58) Field of Classification Search
USPC ............................... 707/201–205, 100–104.1
See application file for complete search history.

(56) References Cited

U.S. PATENT DOCUMENTS

| | | | |
|---|---|---|---|
| 6,801,940 B1 | 10/2004 | Moran et al. | |
| 7,567,991 B2 * | 7/2009 | Armangau et al. | 1/1 |
| 2003/0005109 A1 * | 1/2003 | Kambhammettu et al. | 709/224 |
| 2005/0033777 A1 * | 2/2005 | Moraes et al. | 707/202 |
| 2005/0060574 A1 * | 3/2005 | Klotz et al. | 713/201 |
| 2006/0190236 A1 * | 8/2006 | Malloy et al. | 703/22 |

* cited by examiner

*Primary Examiner* — Usmaan Saeed
*Assistant Examiner* — Cecile Vo
(74) *Attorney, Agent, or Firm* — Park, Vaughan, Fleming & Dowler LLP

(57) ABSTRACT

A method of identifying differences between activity data files includes determining a difference between the activity data files. Causal analysis may be performed to identify a cause of the difference. The difference and/or the cause of the difference may be rendered based on a rendering template. Tier pairs between the activity data files may be matched and a user may be queried to confirm the tier pair match. Statistical and/or protocol differences between each of the activity files may be presented. Transactions between each of the activity data files may be matched including comparing the content files in each of the activity data files that account for the transactions. Client side differences between each of the activity data files may be identified. A categorization may be assigned to each of the determined differences. Determined differences may be excluded from the rendering.

21 Claims, 12 Drawing Sheets

Combined

|  | Classification | Delta | Model 1 |  | Model 2 |
|---|---|---|---|---|---|
| Application |  |  |  |  |  |
| Chattiness |  | -1 % | 2,340/No Bottleneck | > | 2,317/No Bottleneck |
| Network |  |  |  |  |  |
| Network Effects of Chattiness | Moderate | -23.2% | 1.056/Bottleneck | > | 0.811/Bottleneck |
| Effect of Latency | Moderate | -29.6% | 38.9%/Bottleneck | > | 27.4%/Potential Bottleneck |
| Effect of Bandwidth | Moderate | -22 % | 5.0%/No Bottleneck | > | 3.9%/No Bottleneck |
| Effect of Protocol | Moderate | -9.7 % | 19.5%/Potential Bottleneck | > | 17.6%/No Bottleneck |
| Effect of Congestion | Moderate | -22.2 % | 0.9%/No Bottleneck | > | 0.7%/No Bottleneck |
| TCP |  |  |  |  |  |
| Protocol Overhead | Major | 75 % | 8.0%/No Bottleneck | < | 14.0%/No Bottleneck |
| Connection Resets | Major | INF % | 0/No Bottleneck | < | 2/Potential Bottleneck |
| Retransmissions |  |  | 0.0%/No Bottleneck |  | 0.0%/No Bottleneck |
| Out of Sequence Packets |  |  | 0.0%/No Bottleneck |  | 0.0%/No Bottleneck |
| TCP Windowing (A → B) | Moderate |  | -8.3 % 0.012/No Bottleneck | > | 0.011/No Bottleneck |
| TCP Windowing (A ← B) |  |  | 0.214/Bottleneck |  | 0.214/Bottleneck |
| TCP Frozen Window | Major |  | 975.6 % 7.8%/Bottleneck | < | 83.9%/Bottleneck |
| TCP Nagle's Algorithm |  |  | 0.0%/No Bottleneck |  | 0.0%/No Bottleneck |

FIG. 7A

Summary of Delays

|  | Classification | Delta | Model 1 |  | Model 2 |
|---|---|---|---|---|---|
| Processing: 192.168.52.2 | Major | 109.2 % | 12.861 % | < | 26.901 % |
| Processing: 172.16.14.109 | Moderate | 20.5 % | 18.138 % | < | 21.865 % |
| Protocol: 192.168.52.2 <-> 172.16.14.109 | Moderate | -9.7 % | 19.489 % | > | 17.602 % |
| Congestion: 192.168.52.2 <-> 172.16.14.109 | Moderate | -22.1 % | 0.865 % | > | 0.674 % |
| Bandwidth: 192.168.52.2 <-> 172.16.14.109 | Moderate | -22.5 % | 5.044 % | > | 3.909 % |
| Latency: 192.168.52.2 <-> 172.16.14.109 | Moderate | -29.6 % | 38.884 % | > | 27.356 % |
| Delays in Parallel | Major | -64.1 % | 4.718 % | > | 1.693 % |

FIG. 7B

Application Level : 192.168.52.2 <-> 172.16.14.109 : : HTTP

|  | Classification | Delta | Model 1 | | Model 2 |
|---|---|---|---|---|---|
| Cache | | | | | |
|   Hits | | | 0.00 | | 0.00 |
|   Misses | | | 55.00 | | 55.00 |
| Requests | | | | | |
|   Total | | | 55.00 | | 55.00 |
|   Get | | | 55.00 | | 55.00 |
|   Post | | | 0.00 | | 0.00 |
|   Other | | | 0.00 | | 0.00 |
| Return Codes | | | | | |
|   200 - OK | | | 54.00 | | 54.00 |
|   404 - Not Found | | | 1.00 | | 1.00 |
| Response Caching | | | | | |
|   None | | | 55.00 | | 55.00 |
| Content : application/x-javascript | | | | | |
|   Number | | | 8 | | 8 |
|   Percent | | | 15 | | 15 |
|   Average (bytes) | | | 4,117 | | 4,117 |
|   Max (bytes) | | | 29,972 | | 29,972 |
|   Total (bytes) | | | 32,942 | | 32,942 |
| . . . | | | | | |
| Content Encoding : None ("identity") | | | | | |
|   Number | | | | | |
|   Uncompressed Bytes | | | | | |
|   Compressed Bytes | | | | | |
|   Compression Percentage | | | | | |
|   Potentially Compressible Bytes | | | | | |
|   Potential Compressed Bytes | | | | | |
|   Potential Compression Percentage | | | | | |

FIG. 7C

Transaction Summaries : 192.168.52.2 <-> 172.16.14.109 : HTTP

|  | Classification | Delta | Model 1 |  | Model 2 |
|---|---|---|---|---|---|
| Matched |  |  |  |  |  |
|    Number of Transactions |  |  | 19.00 |  | 19.00 |
|    Application Bytes |  | 0.9 % | 94,014.00 | > | 93,152.00 |
|    Application Messages |  |  | 38.00 |  | 38.00 |
|    Application Messages Time | Moderate | 35.6 % | 7.99 | < | 10.84 |
|    Number of Packets |  |  | 92.00 |  | 92.00 |
| Moved |  |  |  |  |  |
|    Number of Transactions |  |  | 36.00 |  | 36.00 |
|    Application Bytes |  | -1 % | 161,016.00 | > | 159,357.00 |
|    Application Messages |  |  | 72.00 |  | 72.00 |
|    Application Messages Time | Major | 63.6 % | 16.32 | < | 26.69 |
|    Number of Packets |  |  | 162.00 |  | 162.00 |

FIG. 7D

Transaction Summaries : 192.168.52.2 <-> 172.16.14.109 : TCP

|  | Classification | Delta | Model 1 |  | Model 2 |
|---|---|---|---|---|---|
| Unmatched |  |  |  |  |  |
|    Number of Transactions | Major | 1300 % | 4.00 | < | 56.00 |
|    Application Bytes |  |  | 0.00 |  | 0.00 |
|    Application Messages | Major | 1300 % | 4.00 | < | 56.00 |
|    Application Messages Time | Major | 1368 % | 0.40 | < | 5.89 |
|    Number of Packets | Major | 1300 % | 4.00 | < | 56.00 |

FIG. 7E

Transaction Details

192.168.52.2 <-> 172.16.14.109 : HTTP : Matched [19]
    1. GET /opnet/index.html
    2. GET /opnet/Making%20Networks%20and%20Applications%20Perform_files/opnet_tag.gif
        .
        .
        .
    18. GET /opnet/Making%20Networks%20and%20Applications%20Perform_files/image_bl.gif
    19. GET /opnet/Making%20Networks%20and%20Applications%20Perform_files/image_br.gif 192.168.52.2 <-> 172.16.14.109 : HTTP : Moved [36]
    1. GET /opnet/Making%20Networks%20and%20Applications%20Perform_files/script10.js
    2. GET /opnet/Making%20Networks%20and%20Applications%20Perform_files/script12.js
        .
        .
        .
    35. GET /opnet/Making%20Networks%20and%20Applications%20Perform_files/image05.gif
    36. GET /opnet/Making%20Networks%20and%20Applications%20Perform_files/seeall_r.gif 192.168.52.2 <-> 172.16.14.109 : TCP : Unique to first ACE model [4]
    1. D=80 S=1307 SYN SEQ=1490403205 LEN=0 WIN=0
    2. D=80 S=1308 SYN SEQ=1490735199 LEN=0 WIN=0
    3. D=80 S=1310 SYN SEQ=1491911122 LEN=0 WIN=0
    4. D=80 S=1311 SYN SEQ=1491949110 LEN=0 WIN=0

192.168.52.2 <-> 172.16.14.109 : TCP : Unique to second ACE model [56]
    1. D=80 S=1202 SYN SEQ=1150765474 LEN=0 WIN=0
    2. D=80 S=1203 SYN SEQ=1151214218 LEN=0 WIN=0
        .
        .
        .
    55. D=80 S=1257 SYN SEQ=1156601938 LEN=0 WIN=0
    56. D=80 S=1219 SYN SEQ=1153437496 LEN=0 WIN=0

FIG. 8B

IDENTIFYING AND REPORTING DIFFERENCES IN NETWORK ACTIVITY DATA FILES

This application claims the benefit of U.S. Provisional Patent Application No. 60/807,230, filed Jul. 13, 2006.

BACKGROUND AND SUMMARY OF THE INVENTION

The present system relates to the field of network troubleshooting and analysis and particularly to a system and method of comparing activity data files to identify differences between the data files that may be of interest.

As the prevalence of network applications continues to grow, so does the need for improved speed and performance associated with these applications. During both the development and deployment of an application it is often critical to identify the impact of the network on the application and the impact of the application on the network. This is often accomplished by recording the network activity, such as network traffic, occurring across the network while the application is being tested, deployed, run, etc. The recorded traffic is typically stored in data files, such as network trace files, which may be subsequently analyzed to identify a cause of application performance problems.

In a typical scenario, a network engineer may suspect a source of a particular problem. The engineer may attempt to identify the potential problem referring to a trace file. To verify whether a determined source of network problems has been properly identified, the engineer may make a change to the network or application in an effort to alleviate the problem or reduce an effect of the problem. For example, in a case where data collisions are an expected cause of application problems, traffic may be partially rerouted to other nodes in the network in an attempt to alleviate the problem. As may be readily appreciated, other adjustments to network operating conditions may be similarly attempted to alleviate a network problem. After enacting a change, the impact of the change may then be analyzed by recording a new trace and comparing the new trace with the trace from before the change.

Analysis of the performance of a network requires examining network activity, such as traffic, that may be directly or indirectly related to the enacted change or that may be totally unrelated. The actual comparison, however, often proves to be a very difficult task. Unrelated changes to the network may have occurred during the time between the traces, and the network conditions, such as network traffic, might vary substantially. Accordingly, a direct comparison of the two trace files may yield a significant quantity of unrelated differences, thereby further complicating the task of identifying differences in the trace files that are attributable to the enacted change in the network. As may be readily appreciated, it is the differences in the data files (e.g., trace file) that are attributable to the enacted change that represent the differences/changes of interest.

Prior systems enable comparing the content of text files, web pages, as well as other types of documents and file formats. Prior systems also enable comparing two or more trace files by calculating statistical information from the trace files and displaying the statistical information in a comparative manner, such as side-by-side. This type of report is called a comparison report. However, in order for the comparison report to be useful, the user must be aware of where to look for differences and how to decipher them once they are found. Such awareness is a significant barrier in complex traces, and therefore a solution is required that aids the user in identifying and analyzing these differences. Further, prior systems provide little or no ability other than manual observations and operations to discern between all differences in network activity and differences in network activity that are of interest (e.g., are attributable to an enacted change).

It is an object of the present system to overcome disadvantages and/or make improvements in the prior art.

The present system includes a system, method and device for identifying differences between activity data files. A difference is determined between the activity data files. Causal analysis may be performed to identify a cause of the difference. The difference and/or the cause of the difference may be rendered based on a rendering template. Tier pairs between the activity data files may be matched. Matching tier pairs may include querying a user to confirm the tier pair match. Statistical and/or protocol differences between each of the activity files may be presented. The differences may be determined based on an analysis of corresponding activity data files.

Transactions between each of the activity data files may be matched. Matching may include comparing the content of a file that accounts for a transaction in a first one of the activity data files to content of a file that accounts for a transaction in a second one of the activity data files. Client side differences between each of the activity data files may be identified. A categorization may be assigned to each of the determined differences. Determined differences may be excluded from the rendering based on criteria. The template may be modified by the user prior to rendering the differences. The differences may be rendered at two or more levels of resolution. The two or more levels of resolution may be selectable within a single user interface, such as by selection of depicted tabs that are each associated with one of the two or more levels of resolution.

The differences may be rendered on a display device within a graphical user interface and/or may be rendered to a data file in tabular form. The difference may be rendered in a hierarchical format. A value for each of the activity data files that accounts for the difference may be rendered. An indicator may also be rendered comparing one of the values to another one of the values. Details of each of the activity data files may be rendered indicating if each of the details are matched, moved or unique between the activity data files.

BRIEF DESCRIPTION OF THE DRAWINGS

The invention is explained in further detail, and by way of example, with reference to the accompanying drawings wherein:

FIG. 7A shows a combined difference report that illustratively shows differences related to applications, network and communication protocol that result in network bottlenecks provided in accordance with an embodiment of the present system;

FIG. 7B shows a summary of delays in accordance with an embodiment of the present system;

FIG. 7C shows application level activity and differences in accordance with an embodiment of the present system;

FIG. 7D shows transaction summaries for transactions utilizing HTTP in accordance with an embodiment of the present system;

FIG. 7E shows transaction summaries for transactions utilizing TCP in accordance with an embodiment of the present system;

FIG. 8B shows a difference report provided within a table in accordance with a further embodiment of the present system.

DETAILED DESCRIPTION

Figure 1:
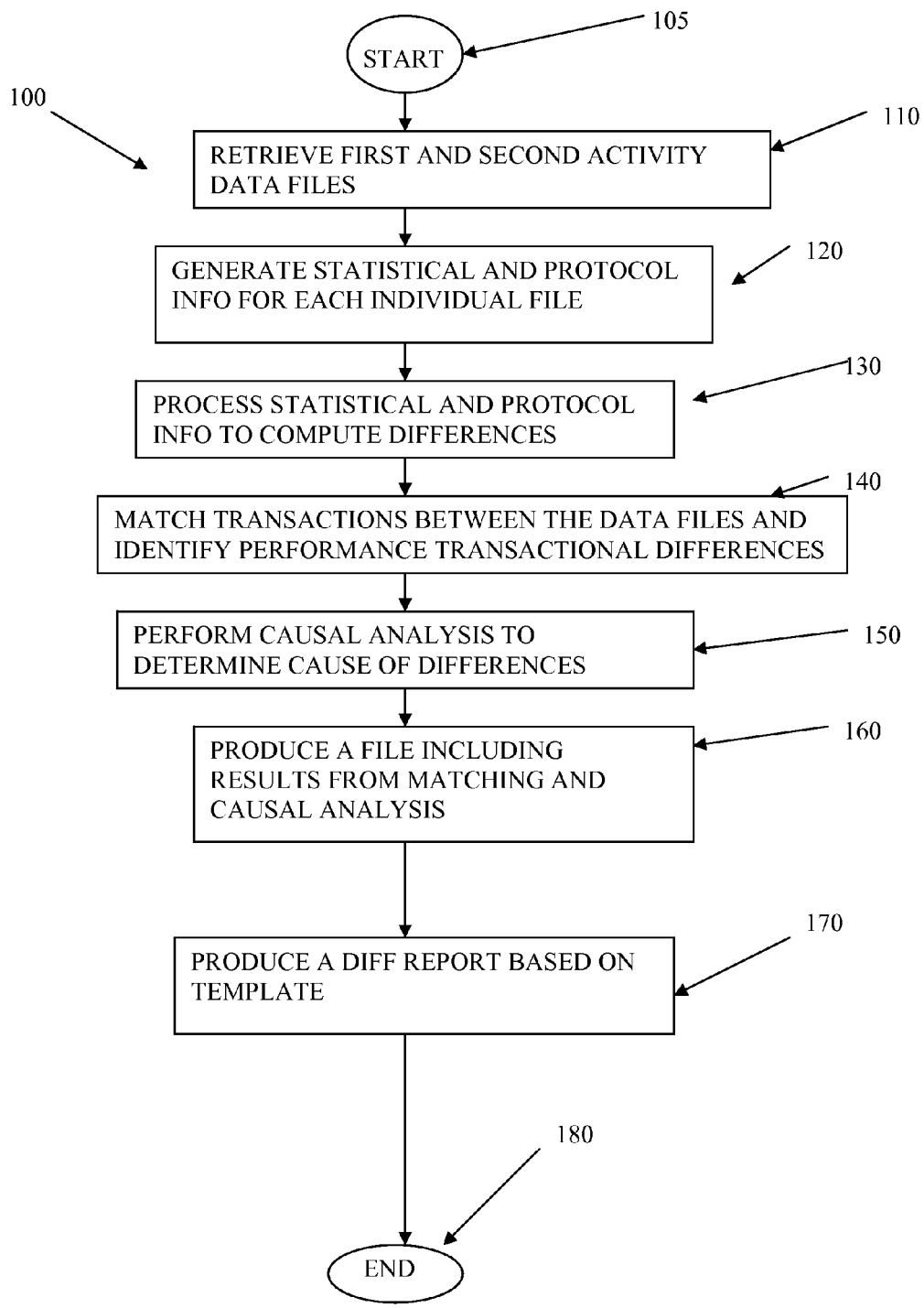
FIG. 1 shows an illustrative flow diagram of a process in accordance with an embodiment of the present system.

The following are descriptions of illustrative embodiments that when taken in conjunction with the following drawings will demonstrate the above noted features and advantages, as well as further ones. In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system. In the drawings, a first part of an element's reference number typically corresponds to the drawing number in which the element appears.

The system and method described herein address problems in prior art systems. The present system is directed towards providing a new, intuitive and meaningful reporting that illustrates differences between two network activity files, such as traffic trace files. To facilitate the following discussion, for purposes of simplifying a description, the term "activity" as utilized herein is intended to include any activity related to a network object, including traffic, delays, collisions, housekeeping processes, and any other operations of a network object. The present reporting is illustratively referred to herein as a "difference report". Through use of the present system, the functionality and usefulness of comparison reports is greatly extended. The difference report offers a range of features and provides additional functionality for the user that is unavailable in prior systems. In accordance with the present system, the difference report provides an intuitive layout and includes transactional analysis. The present system also assists in identifying application protocol differences and permits a user to assign thresholds so that the differences can be categorized as major, moderate, minor, or essentially no change. These various thresholds and parameters may be established to limit a type and category of differences that are presented in the different report. Further, through use of the present system, the user may also filter the contents of the difference report to include only certain types or categories of differences in order to reduce the contents to that which is most relevant to that user.

The present system will be further described referring to FIG. 1 and following figures. FIG. 1 shows an illustrative flow diagram 100 of a process in accordance with an embodiment of the present system. Provided that there are two or more available activity data files (e.g., trace files), a single difference object may be generated from all activity data files selected. Typically, the different activity files of interest will pertain to network configurations before and after one or more changes in the network are performed. However, as may be readily appreciated, the activity data files may simply pertain to activity at different times on the network.

Figure 2:
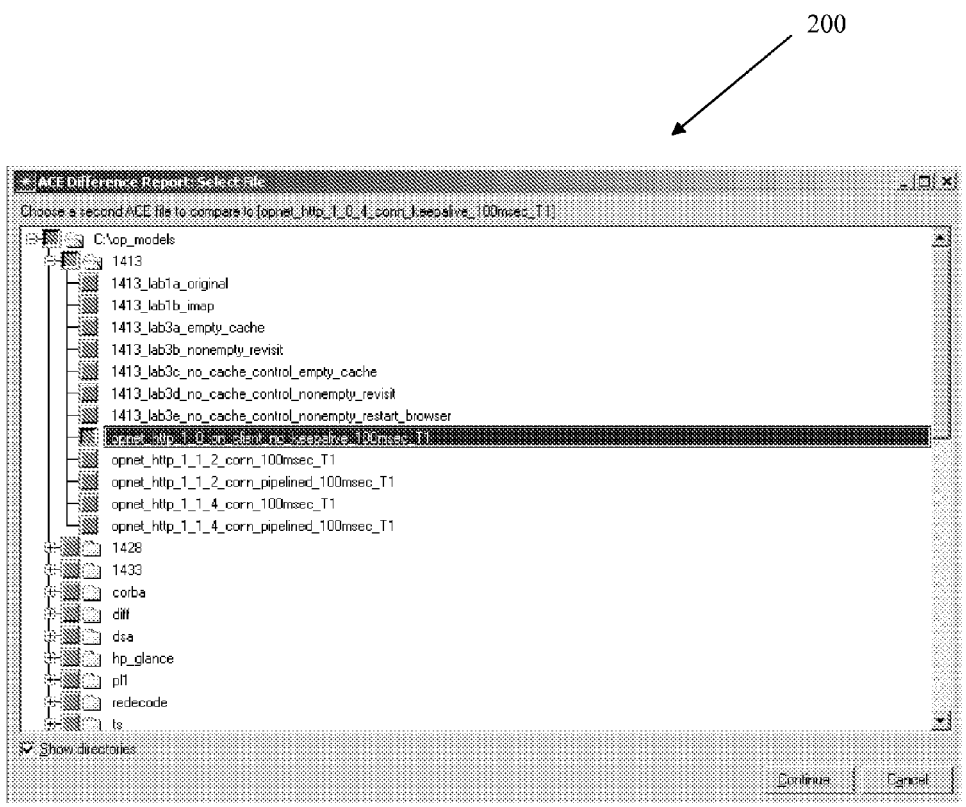
FIG. 2 shows an illustrative user interface (UI) as a graphical user interface (GUI) that may be utilized in accordance with the present system for selection of activity data files.

The process starts during act 105. During act 110, two or more activity data files are selected for comparison by a user. FIG. 2 shows an illustrative user interface (UI) 200 as a graphical user interface (GUI) that may be utilized in accordance with the present system for selection of activity data files. The UI 200 is illustratively shown depicted including a typical windowing environment. Menu items provided may be typical of those in a windowing environment, such as may be represented within a Windows™ Operating System GUI as provided by Microsoft Corporation. The objects and sections of the visualization may be navigated utilizing a user input device, such as a mouse, trackball and/or other suitable user input. The user input device may be utilized for selecting activity data files and other depicted objects within the GUI as discussed further herein. Further, the user input may be utilized for selection of menu items, radio buttons and other common interaction paradigms as understood by a person of ordinary skill in the art.

Figure 3:
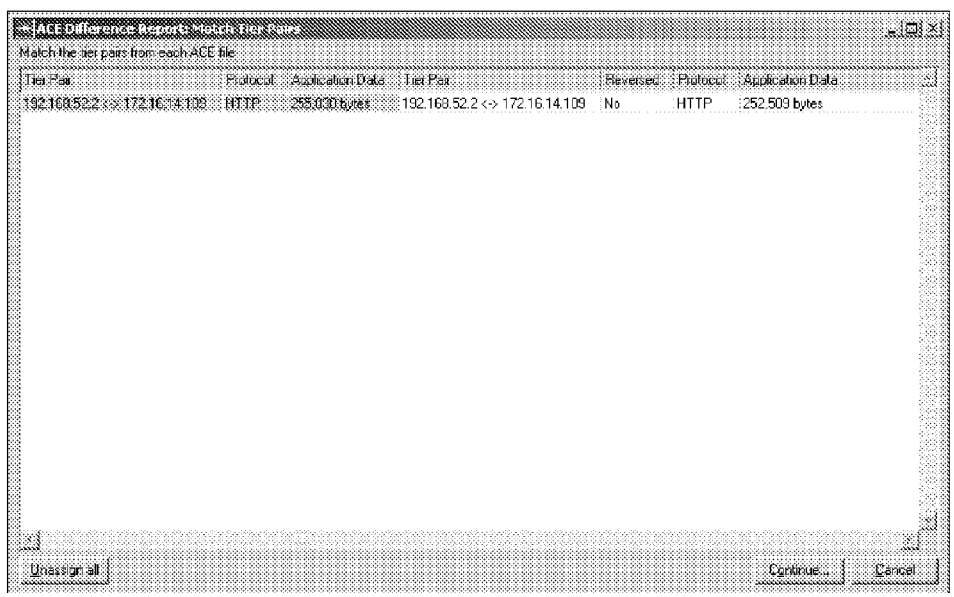
FIG. 3 shows an embodiment of the present system wherein a GUI is provided that queries the user to match/confirm the tier pairs that are present in the activity files.

The selected activity data files are retrieved and a UI may be provided to the user for the user to confirm that tier pairs present in the activity files are properly matched. FIG. 3 shows an embodiment of the present system wherein a GUI 300 is provided that queries the user to match/confirm the tier pairs that are present in the activity data files. In accordance with another embodiment of the present system, this step may be deleted and tier pair matching may simply be performed without user confirmation and/or matching.

Tier matching is significant in that it assists in ensuring that portions of a network in a first of the activity data files are properly matched to a corresponding portion of the network in a second one of the activity data files. Tier pairs represent a source and sink of a given network activity, such as a source node of the network initiating a transmission of a packet to a sink node (for that packet) of the network. As may be readily appreciated, oftentimes transmissions between portions of the network often are bidirectional such as when a sink of a transmission sources an acknowledgement of the transmission. By properly matching tier pairs within two or more activity data files, the present system is aided in matching activities within the activity data files. In many cases, this may simply be a case of matching a given pair of devices, IP addresses, etc., in each of the activity data files. For example, as shown in FIG. 3, tier pair 192.168.52.2<->172.16.14.109 of one activity data file is matched to the same tier pair 192.168.52.2<->172.16.14.109 in another one of the activity data files. In other cases, such as where a portable device is replaced in the network with another portable device, the activity between devices may be similar while a given one or more of the devices and corresponding IP addresses may be different. By matching the tier pairs within the activity data files, activities may be matched whether or not devices responsible for the activity have changed. Further, based on network matters, such as network loading and/or changes initiated within the network, given portions of the network handling activities may change from one activity data file to a next activity data file while the activity is the same or similar. In this scenario, tier pair matching again assists in properly matching activities between the activity data files as described further herein.

Returning to FIG. 1, during act 120, statistical and protocol information is generated for each individual activity data file selected. In accordance with the present system, each transaction contained in the individual activity files may be analyzed for its performance including activity such as packet traffic transferred across a network. An activity file, such as a network trace file, is a file that contains records representing network packets including information identifying a path of the packets, a transmission protocol and other information related to the packets' transmission through the network. A network trace file is a file obtained by performing packet captures, packet sniffing, etc., where a software and/or hardware tool monitors activity on a network and records information to the network trace file corresponding to the packets observed on the network. In generating the statistical and protocol information, the activity recorded in the trace file is analyzed to identify network transactions and protocols that resulted in recorded activity, for example, the activity data file may record a level of activity. In generating the statistical and protocol information, network transactions related to the activity are identified and associated with the recorded activity. For example, while the activity data file may identify a given level of activity, during the act 120, network transactions such as transfers of given data files, etc., are associated with the recorded activity including, when appropriate, the transfer protocols of the activity. Activity data files may also contain other types of data. For example, performance monitoring statistics (e.g., perfmon) of processors within the network such as CPU, memory, and disk IO usage. Other data, for example, may include a sequence of function calls from an application. Further data related to network activity would readily occur to a person of ordinary skill in the art and is intended to be within the scope of the present system. One or more of the data (e.g., perfmon data, etc.) may be correlated with the network activity data to assist in making a more complete picture of application performance.

During act 130, the statistical and protocol information generated for each selected activity file is compared to identify differences between the activity files including differences in the statistical and protocol information. Transactions are matched between the activity data files and performance transactional differences are identified during act 140. In accordance with an embodiment of the present system, transactional differences may be identified through simple ASCII comparisons of the raw activity data and/or subsets of the activity data. Further, a more detailed analysis may be performed on the actual data that was transferred in addition to or in place of the ASCII comparisons. For example, in Hypertext Transfer Protocol (HTTP), two activity files might include a "GET index.html", however, the data transferred might be substantially different. Additionally, two GET requests for different image files, such as "image01.gif" and "picture.gif" may be substantially identical when the images are viewed side by side even though the names of the files are different. An analysis of the files involved in the network transaction may therefore match (or not) these transactions. The analysis in accordance with the present system may include sophisticated operations that analyze the data (e.g., images) and/or data portions to determine similarities and/or differences.

By analyzing differences between the activity data files at a transactional level as opposed to at a level of the activity, greater insight into the differences is provided by the present system in accordance with an embodiment. As in the example provided above regarding graphics interchange files (.gif), the analysis at the transactional level enables a view into differences and similarities in activities heretofore unrealizable in prior systems. Further, since it is oftentimes changes in transactions that are of interest in system analysis, the present system may provide a view of network activity at a granular level that avoids a need to sift through data that is more granular and therefore more cumbersome to review. As may be readily appreciated, the level of granularity of the analysis (e.g., the transactional level) may be readily adjusted to suit a given user's needs.

During act 150, causal analysis is performed on the transactions to determine a cause of identified differences. For example, changes in network performance may be attributed to network changes enacted between the capturing of the activity files, however, changes in network performance may also be attributable to other factors, such as differences in network traffic. These differences and others are identified during the causal analysis and thereafter are stored together with all other information discerned thus far during act 160. In one embodiment, the stored data is stored in a preset format to facilitate further operations as described herein. By performing causal analysis, the present system not only identifies differences in the activity files, but may also determine underlying reasons for the differences. For example, the present system might identify causes of differences such as what accounts for differences in response time (e.g., the difference in latency accounts for 98% of the difference in response time). Further, causal analysis may identify client side differences such as one client in one activity data file was using Internet Explorer™ v5, while in the other activity data file, the client was using Firefox™ 1.5 or one Citrix client in one activity data file is using compression while in the other activity data file the Citrix client is not using compression. These types of differences incite differences in the activity data files that are not related to changes that may be enacted in network operation yet may have a tremendous impact in network performance and is not readily discernable in prior systems.

Causal analysis may also identify operating system differences between the activity data files based on observed differences in Transmission Control Protocol (TCP) behavior. Causal analysis in accordance with the present system may identify a presence of Wide Area Network (WAN) accelerators in one or more of the activity data files that may account for activity differences within the activity data files. Other causal analysis may identify changes in application design, different protocol versions (e.g. HTTP 1.1 vs 1.0), and/or the use of transport protocols (e.g. TCP vs. UDP), differences in specific protocol settings (e.g. HTTP using connection keepalive). In accordance with the preset system, a scriptable causal analysis engine may be created to apply other root-cause analyses that may occur to a person of ordinary skill in the art. In one embodiment, a rules database may be applied to any determined differences to assist in identifying causes of differences. For example, a rules database may cause the present system to perform an inspection/comparison of file header information that may be related to activity in each of the activity data files that are being compared to discern differences that may account for activity differences.

During act 170, a desired template may be selected for filtering and/or categorizing the differences. Naturally, in another embodiment the template may be selected prior to or shortly after the start of the process. Additional templates may be derived from preformed templates or may be created from scratch. For each template selected, the present system may create a separate difference report. The templates may define what statistics should be ignored and/or how to categorize the differences, such as none, minor, moderate, or major. The template may also set levels of differences that correspond to the categories for one or more (e.g., each) of the differences. In an alternate embodiment, this step may be performed on an as needed basis. The template may also (or in place of other features) provide a selection of a level of detail that is provided in subsequent reports or provide a criteria for filtering data out of the difference report (or for including data in the report). For example, different summaries may be provided and/or different types of analysis may be performed based on a selected template.

A difference report based on the selected template is produced and may be provided graphically within the UI, may be provided in a tabular format, and/or may be written to a difference file for later review. For example, the difference report may be generated and output in a format that may be suitably displayed and/or saved, such as in HyperText Markup Language (HTML) format. Other formats for the difference report may also be suitably employed in place of HTML or in addition to it in accordance with the present system. In accordance with an embodiment of the present system, the system may present a GUI that enables the user to preview and filter the results of the difference report. The preview may include a summary page including, for example, totals for each type of difference determined. In accordance with a further embodiment, the user may filter the results such that the final report includes all the determined differences or any subset of all the differences. For example, the results may be filtered to include only major differences, moderate and above differences, and/or minor and above differences. In accordance with an embodiment, the difference file may serve as an input to other systems that provide further analysis.

Figure 4:
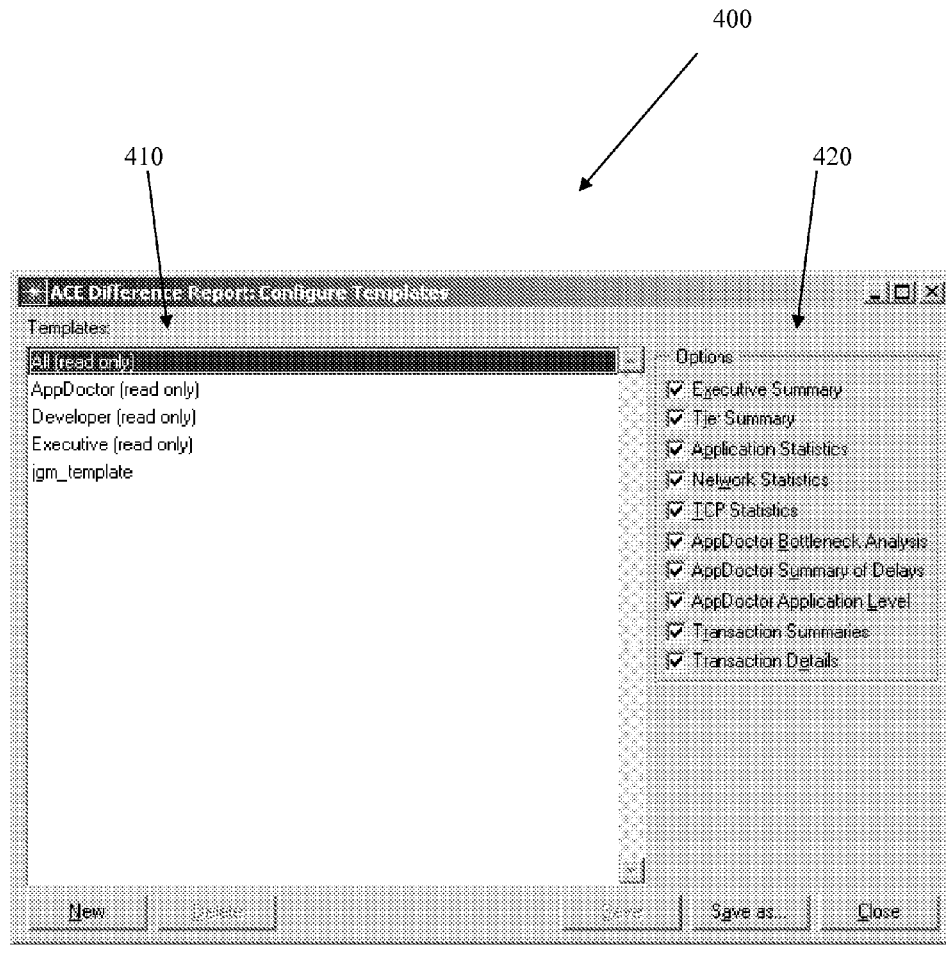
FIG. 4 shows an illustrative GUI that may be utilized in accordance with the present system for selection, editing and/or creation of a template.

FIG. 4 shows an illustrative GUI 400 that may be utilized in accordance with the present system for selection, editing and/or creation of a template. A template portion 410 of the GUI 400 may include a listing of templates that are available while an options portion 420 may list options that are desired for production of reports that correspond to selected templates. In accordance with an embodiment, templates may be provided that are preformed to provide typical filtering processes. Illustratively, four such preformed templates are illustratively shown as "All", "AppDoctor™", "Developer", and "Executive". These templates are illustratively shown as "read only" indicating that the templates may not be edited. In accordance with an embodiment of the present system, changes to the preformed templates options may be made and thereafter, saved under a new name, thereby not changing the preformed templates, by selection of a "Save as . . . " button 430 as may be readily appreciated. The options associated with each template may be designated utilizing a check mark depicted before options as illustrated in the options portion 420. In accordance with this embodiment, selection of a template, such as "All", results in check marks being depicted before each of the options that are utilized by the selected template. In another embodiment, the filtering/template options may be altered and/or extended through a scriptable interface to enable flexible filtering operations that are of interest to a given user (e.g., remove all activity not related to a given sub-portion of a network, etc.).

Figure 5:
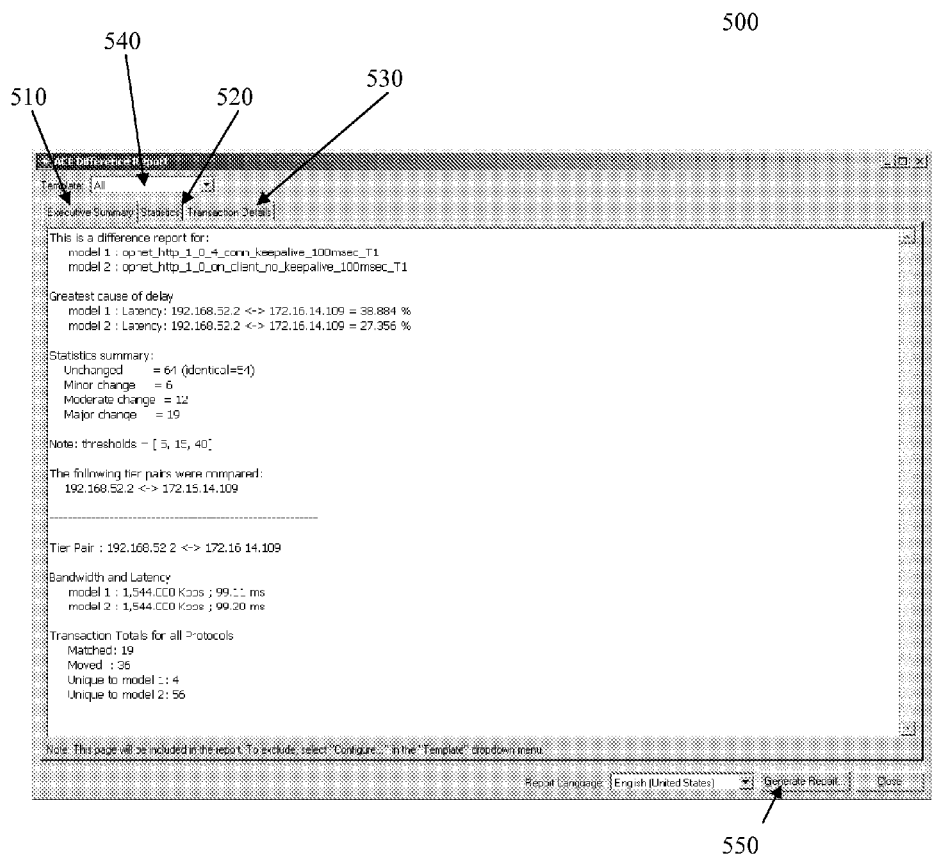
FIG. 5 shows a difference report provided within a GUI in accordance with an embodiment of the present system.

FIG. 5 shows a difference report provided within a GUI 500 in accordance with an embodiment of the present system. In accordance with this embodiment, tabs are provided to enable separate depiction of different portions of the difference report. Illustratively, tabs are depicted to present, for example, different levels of granularity of data available from the difference report. As may be readily appreciated, in other embodiments, the entire difference report may be depicted at one time, or any portion thereof beyond the portions depicted in FIG. 5. In a further embodiment, tabs and/or one or more other visual metaphors may be utilized for parsing, sorting, etc., the data. For example, in one embodiment, a visual depiction of separate folders may be utilized to provide access to different portions of the report. Illustratively, tabs are shown including an Executive Summary Tab 510, a Statistics Tab 520 and a Transactions Detail Tab 530. In FIG. 5, the Executive Summary Tab 510 is illustratively selected providing a summary of the difference report, such as which activity files are utilized as input to the difference report, what is the largest contributor to delay in the networks, a statistics summary including an indication of the thresholds utilized in classifying the changes, tier pairs utilized for comparison, and transaction totals for all protocols. Naturally, other details may be similarly summarized as a portion of a depicted summary in accordance with the present system. Further in accordance with the depicted embodiment, selection of which template to apply in generating the difference report may be selected through template selection box 540 and the difference report may be generated though selection of a "Generate Report . . . " button 550.

Figure 6:
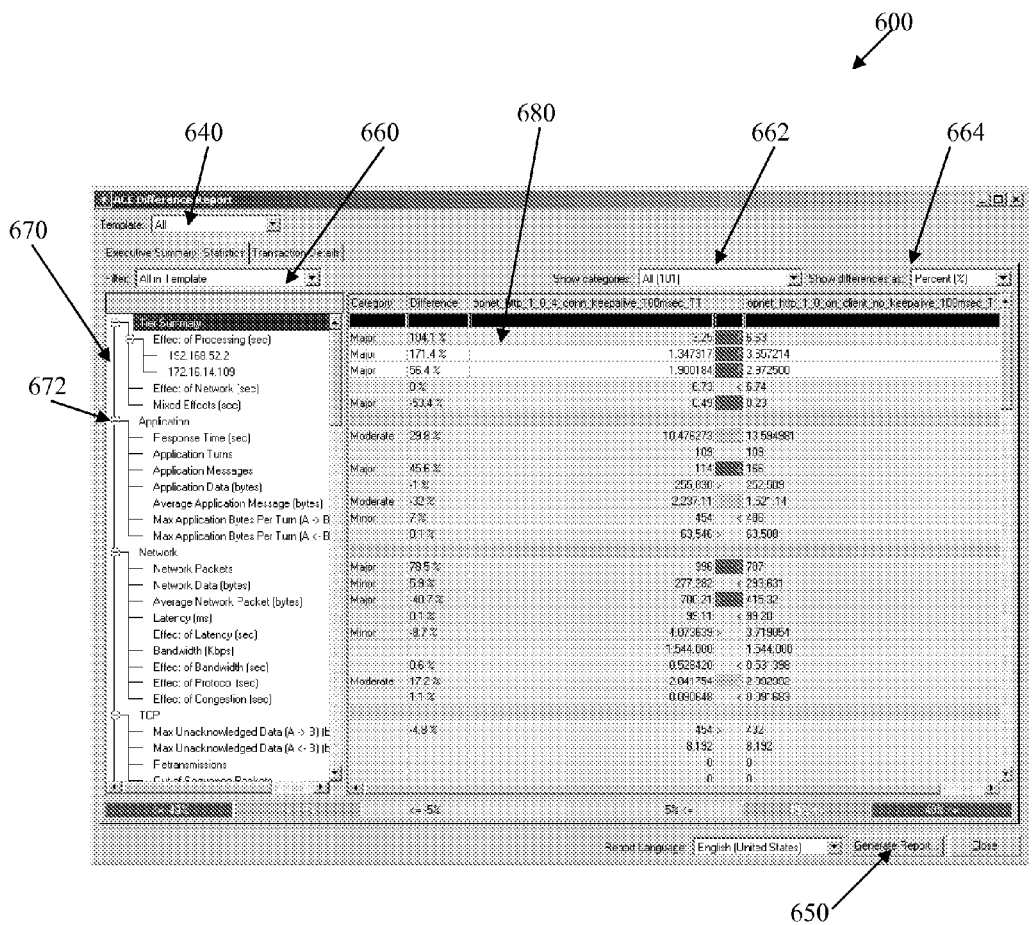
FIG. 6 shows a difference report provided within a GUI in accordance with an embodiment of the present system.

FIG. 6 shows a difference report provided within a GUI 600 in accordance with an embodiment of the present system. In accordance with this embodiment, a Statistics Tab 620 is selected illustrating detailed statistics produced as a portion of the difference report. The template utilized for generating the difference report is depicted and may be determined by a template selection box 640 and a "Generate Report . . . " button 650. Further, portions of the difference report may be filtered from view through selection within the Filter selection box 660 and Show categories selection box 662 which limits the categories depicted in this view. Differences between the activity files may be depicted as hierarchical categories of differences in a portion 670 of the GUI 600. The categories may include one or more of "Effect of Processing", "Effect of Network", "Mixed Effects", Application Categories, Network Categories, Transmission Control Protocol (TCP) Categories, Combined Categories (e.g., depicted in FIG. 7A in tabular form including network bottlenecks), Summary of Delays Category (e.g., depicted in FIG. 7B in tabular form), Application Level Categories (e.g., depicted in FIG. 7C in tabular form), Transaction Summary Categories, such as broken down by communication protocols (e.g., depicted in FIGS. 7D and 7E in tabular form). Numerous other forms of depicting differences would readily occur to a person of ordinary skill in the art and are within the scope of the present system.

In one embodiment, different categories, filters causal connections, etc., for example, may be implemented as plug-in program portions, referred to for simplicity as plug-ins. As may be readily appreciated, a plug-in may be a hardware and/or software module that adds a specific feature or service to a larger system, such as an activity difference reporting system in accordance with the present system. In accordance with an embodiment, one or more of the components of the present system may simply plug in to expand capabilities of a system. One or more of the portions of the present system may enable developers to extend and/or customize behavior of the present system. In an alternate embodiment, additional categories, filters, etc., may be incorporated into a customized (or customizable) template.

Returning to FIG. 6, details of the differences may be exposed or collapsed by selection of corresponding "+" or "–" indications (e.g., indication 672) as may be typical of hierarchical views provided within GUI's. Illustratively, details of differences are provided in a details portion 680 including, for example, a category of the difference (e.g., major, moderate, etc.), a percent difference, actual differences and an indication as to whether the depicted element is larger in the first or second activity data file. Additionally, one or more of color coding, shading, etc., may be utilized to assist in rapidly identifying elements that are contributors to differences between the activity data files.

Figure 8A:
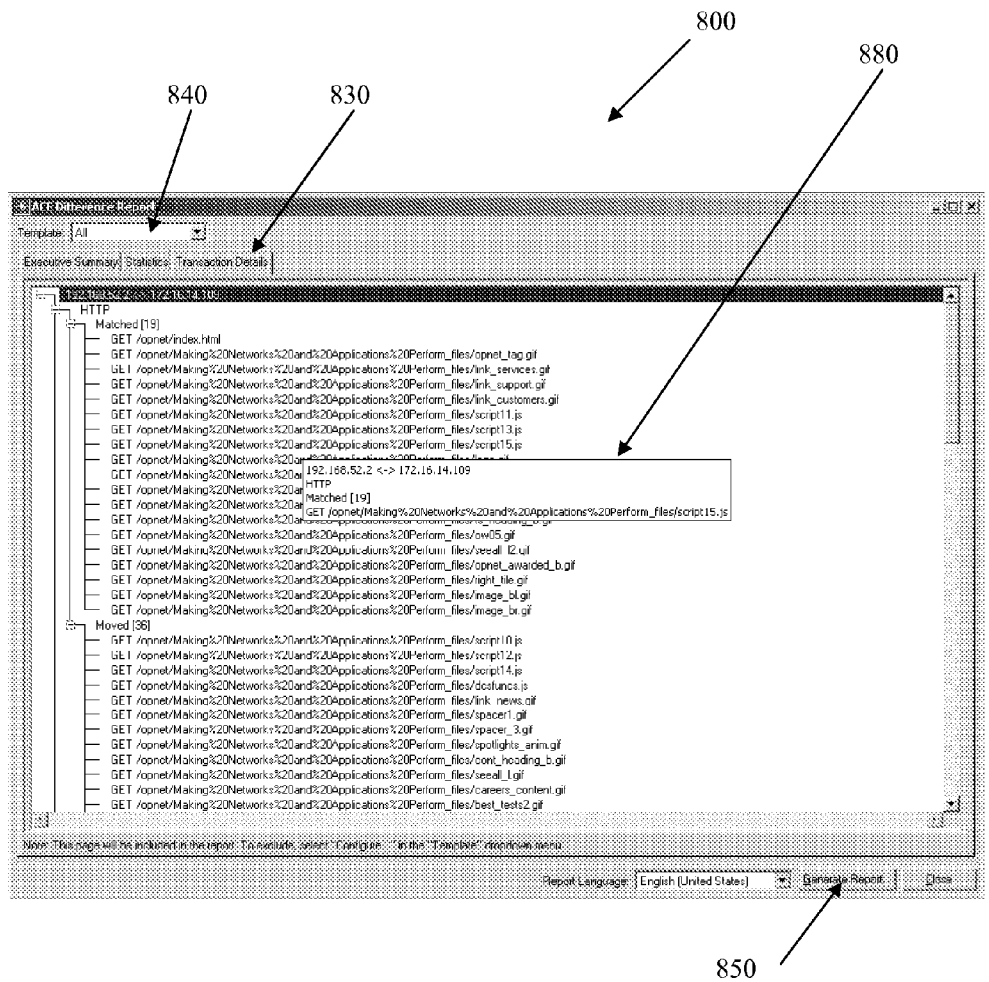
FIG. 8A shows a difference report provided within a GUI in accordance with an embodiment of the present system.

FIG. 8A shows a difference report provided within a GUI 800 in accordance with an embodiment of the present system. In accordance with this embodiment, a Transaction Details Tab 830 is selected illustrating transaction details produced as a portion of the difference report. The template utilized for generating the difference report is depicted and may be determined by a template selection box 840 and a "Generate Report . . . " button 850. Details of transactions depicted may include an identification of the transaction pair, an identification of the transaction (e.g., GET file), the transaction communication protocol, whether the transaction is matched between the activity data files, moved or unique, etc. Other transaction details may also be readily provided. A tooltip box 880 may provide details for a row depicted in the report that lies beneath a cursor (not shown) positioned by the user. FIG. 8B shows a difference report provided within a table 800 in accordance with a further embodiment of the present system.

As should be understood from the description included herein, the present system constructs a difference report that is a dramatic improvement over the prior art. The present system provides an intuitive organization (e.g., see, FIG. 6) wherein reported statistics may be categorized according to application, network, protocol, etc., which makes navigating and filtering tasks simpler for the user. The UI may provide one or more configuration options wherein one or more fields or properties may be assigned a threshold value so that differences may be categorized, such as none, minor, moderate, or major. The present system enables a presentation of high level protocol differences, for example, pertaining to high level protocols like HTTP and Citrix. Summary statistics for transactions may be compared to filter (e.g., remove) transaction differences that are unrelated to network changes that are enacted between capturing of the activity data files. For example, activities may be classified as matched, matched but moved, and unmatched. The analysis in accordance with the present system may conclude that a given percentage (e.g., 80%) of the transactions was matched, another percentage (e.g., 10%) was moved and a further percentage (e.g., 10%) is new. A particular user may determine that new transactions are unrelated to the network change and therefore, may be of little interest in the difference report.

Protocol summary differences may be produced (e.g., see, FIG. 7D) that include top-level protocols and an indication of the amount of traffic in packets and in payload. This portion of the report may be helpful to network engineers that would like to see how their network traffic changed as opposed to analyzing a particular application. As may be appreciated, results of any of the portions of the difference reports may be graphed including statistical information from the activity files. The graphs may be displayed adjacent to one another or as a single merged graph. For example, a throughput graph from one activity data file may be merged with the throughput graph from a second activity file. In another embodiment or as an additional option to the prior embodiment, the two graphs may be displayed in a side by side manner.

Through use of reporting templates, users may create and manage a plurality of templates, which allow them to quickly manipulate the types and categories of differences that appear in a difference report. The present system enables a ready identification of differences in the number of network connections and other TCP-related statistics. In accordance with an embodiment, actual objects, web pages, etc., may be compared to determine differences or similarities from one activity data file to another that may not otherwise be apparent.

Figure 9:
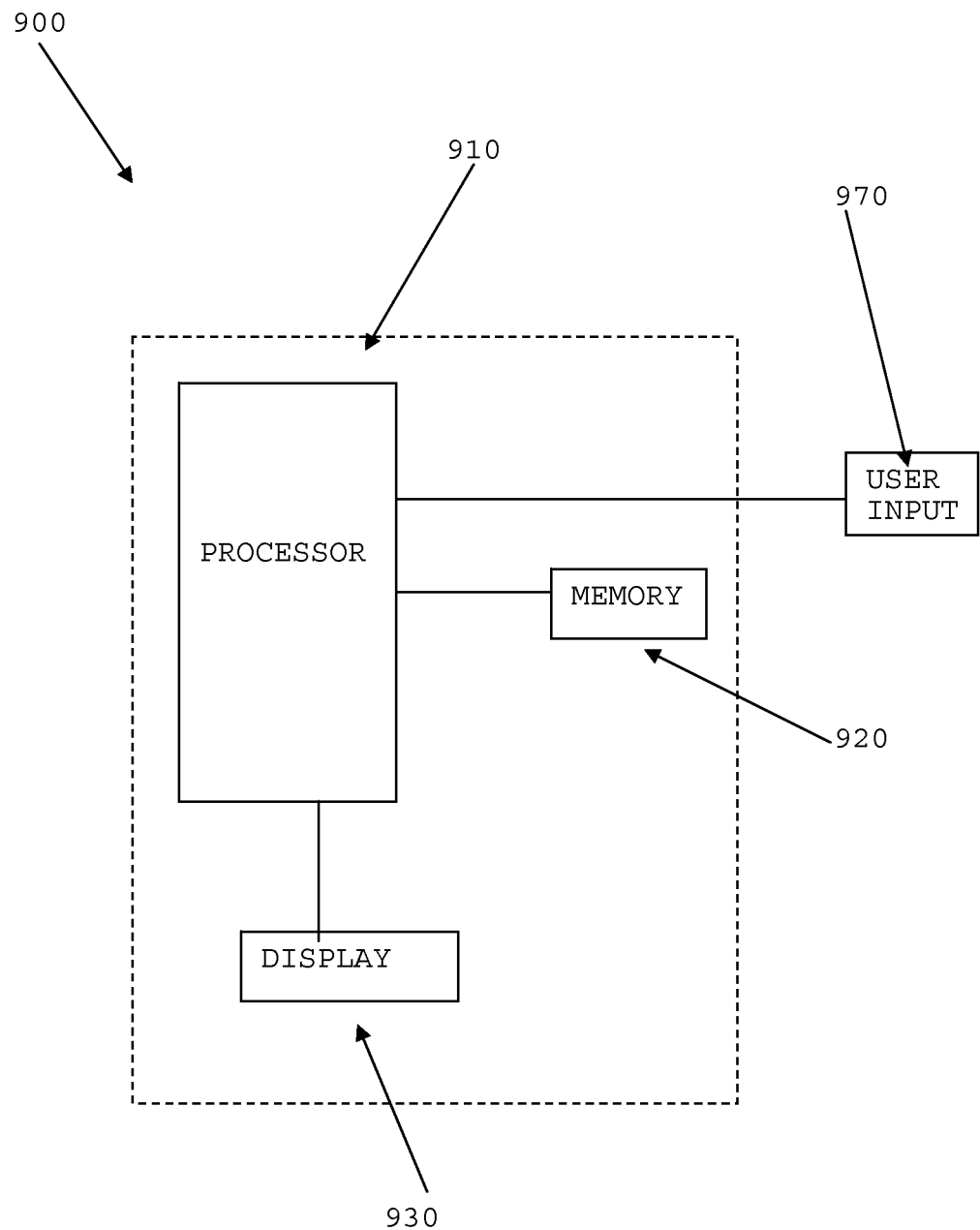
FIG. 9 shows a device in accordance with an embodiment of the present system.

FIG. 9 shows a device 900 in accordance with an embodiment of the present system. The device has a processor 910 operationally coupled to a memory 920, a display 930, and the user input device 970 as discussed above. The memory 920 may be any type of device for storing application data as well as other data, such as activity data, etc. The application data and other data are received by the processor 910 for configuring the processor 910 to perform operation acts in accordance with the present system. The operation acts include controlling of the display 930 to display the UI described herein. The user input 970 may include a keyboard, mouse, trackball or other device(s), including touch sensitive displays, which may be stand alone or be a part of a system, such as part of a personal computer, personal digital assistant, or other display device for communicating with the processor 910. The communication between the user input 970 and the processor 910 may be any type of operable link, such as a wired or wireless link. The user input device 970 is operable to enable initiation of processing acts, such as act 105 and following acts of FIG. 1 as well as enabling interaction with the acts. Clearly the processor 910, memory 920, display 930 and/or user input device 970 may all or partly be a portion of a computer system or other device.

The methods of the present system are particularly suited to be carried out by a computer software program, such program may contain modules corresponding to the individual steps or acts of the methods. Such program may of course be embodied in a computer-readable medium, such as an integrated chip, a peripheral device or memory, such as the memory 920 or other memory, such as a cache memory coupled to the processor 910.

The computer-readable medium and/or memory 920 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, or a wireless channel using time-division multiple access, code-division multiple access, or other radio-frequency channel). Any medium known or developed that may store information suitable for use with a computer system may be used as the computer-readable medium and/or memory 920.

Additional memories may also be used. The computer-readable medium (e.g., the memory 920) and/or any other memories may be long-term, short-term, or a combination of long-term and short-term memories. These memories configure processor 910 to implement the methods, operational acts, and functions disclosed herein. The memories may be distributed such as residing on one or more servers connected within a network or may reside local to the device 900 and the processor 910, where additional processors may be provided that may also be distributed or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory 920, for instance, because the processor 910 may retrieve the information from the network for operation in accordance with the present system.

The processor 910 is capable of providing control signals and/or performing operations in response to input signals from the user input device 970 and executing instructions stored in the memory 920. The processor 910 may be an application-specific or general-use integrated circuit(s). Further, the processor 910 may be a dedicated processor for performing in accordance with the present system or may be a general-purpose processor wherein only one of many functions operates for performing in accordance with the present system. The processor 910 may operate utilizing a program portion, multiple program segments, or may be a hardware device utilizing a dedicated or multi-purpose integrated circuit.

As should now be apparent, the present system aids a user in identifying differences and reasons for the differences among two or more network activity data files. Of course, it is to be appreciated that any one of the above embodiments or processes may be combined with one or more other embodiments or processes or be separated into additional parts in accordance with the present system. For example, transactional differencing may be provided without causal analysis and/or reporting based on a template. Causal analysis may be provided without transactional differencing and/or reporting based on a template. Lastly, template-based reporting may be provided without transactional differencing and/or causal analysis.

Finally, the above-discussion is intended to be merely illustrative of the present system and should not be construed as limiting the appended claims to any particular embodiment or group of embodiments. For example, while much of the illustrative discussion presented focuses on providing a visualization of results of analyzing two or more activity data filed in accordance with the present system, the present system may also be readily incorporated as part of some other application that performs a further operation, such as adjusting network resources based on the results and/or providing results to a further system for further analysis without actually providing a visualization of the results. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method comprising:
matching tier pairs between activity data files, wherein matching tier pairs includes querying a user to confirm the tier pair match;
generating protocol information for each of the activity data files;
determining, by a processor, a difference between the activity data files, wherein determining the difference between the activity data files includes determining a difference between each of the activity data files' protocol information;
performing, by the processor, causal analysis to identify a cause of the difference; and
rendering, by the processor, the difference and the cause of the difference based on a rendering template.

2. The method of claim 1, including generating statistical information for each of the activity files, wherein determining the difference includes determining a difference between each of the activity data files statistical information.

3. The method of claim 1, wherein determining the difference includes matching transactions between each of the activity data files.

4. The method of claim 3, wherein matching transactions includes comparing content of a file that accounts for a transaction in a first one of the activity data files to content of a file that accounts for a transaction in a second one of the activity data files.

5. The method of claim 1, wherein performing causal analysis includes identifying client side differences between each of the activity data files.

6. The method of claim 1, wherein the determined difference is a plurality of determined differences and wherein the rendering template includes a categorization that is assigned to each of the plurality of determined differences.

7. The method of claim 1, wherein the rendering template includes a criterion to identify a difference that is excluded from the rendering.

8. The method of claim 1, including modifying the template prior to the rendering act.

9. The method of claim 1, wherein rendering includes rendering the difference with at least two levels of resolution.

10. The method of claim 9, wherein each of the two levels of resolution are selectable for rendering within a user interface.

11. The method of claim 1, wherein rendering includes rendering on a display device within a graphical user interface.

12. The method of claim 1, wherein rendering the difference includes rendering the difference in a hierarchical format.

13. The method of claim 12, wherein rendering the difference includes rendering a value for each of the activity data files that accounts for the difference.

14. The method of claim 12, wherein rendering the difference includes rendering transaction details of each of the activity data files and indicating if each of the details are one of matched, moved and unique between the activity data files.

15. The method of claim 13, including rendering an indicator comparing one of the values to another one of the values.

16. A non-transitory computer readable medium upon which is stored a program that, when executed by a processor, causes the processor to:
- matching tier pairs between activity data files, wherein matching tier pairs includes querying a user to confirm the tier pair match;
- generating protocol information for each of the activity data files;
- determine a difference between the activity data files, wherein determining the difference between the activity data files includes determining a difference between each of the activity data files' protocol information;
- perform causal analysis to identify a cause of the difference; and
- render the difference and the cause of the difference based on a rendering template.

17. The medium of claim 16, wherein the program causes the processor to generate statistical information for each of the activity files, and to determine the difference based on a difference between each of the activity data files statistical information.

18. The medium of claim 16, wherein the program causes the processor to generate protocol information for each of the activity files, and to determine the difference based on a difference between each of the activity data files protocol information.

19. The medium of claim 16, wherein the program causes the processor to match transactions between each of the activity data files by comparing content of a file that accounts for a transaction in a first one of the activity data files to content of a file that accounts for a transaction in a second one of the activity data files.

20. The medium of claim 16, wherein the program causes the processor to perform the causal analysis based on client side differences between each of the activity data files.

21. The medium of claim 16, wherein the program causes the processor to categorize the difference and render the categorization.

* * * * *